US011835026B2

(12) United States Patent
Travers et al.

(10) Patent No.: US 11,835,026 B2
(45) Date of Patent: Dec. 5, 2023

(54) # ROOT PORTION FOR A WIND TURBINE BLADE

(71) Applicant: General Electric Renovables Espana, S.L., Barcelona (ES)

(72) Inventors: Alexis Travers, Nantes (FR); Sisouvanh Sonethavy, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/539,411

(22) Filed: Dec. 1, 2021

(65) Prior Publication Data

US 2022/0178345 A1 Jun. 9, 2022

(30) Foreign Application Priority Data

Dec. 3, 2020 (EP) .................................... 20383056

(51) Int. Cl.

*F03D 1/06* (2006.01)
*F03D 13/10* (2016.01)
*F03D 13/40* (2016.01)

(52) U.S. Cl.

CPC ........... *F03D 1/0658* (2013.01); *F03D 13/10* (2016.05); *F03D 13/40* (2016.05); *F05B 2230/61* (2013.01); *F05B 2240/221* (2013.01); *F05B 2260/02* (2013.01)

(58) Field of Classification Search

CPC ........ F03D 1/0658; F03D 13/10; F03D 13/40; F05B 2230/61; F05B 2240/916; F05B 2240/941; F05B 2240/931; F05B 2260/02

See application file for complete search history.

(56) References Cited

U.S. PATENT DOCUMENTS

2008/0118365 A1* 5/2008 Bendel .................. F03D 1/0658 416/244 R
2014/0270612 A1* 9/2014 Ebbesen ................. F16C 35/00 29/898
2014/0356113 A1* 12/2014 Schmidt ................. B65G 47/82 414/800
2020/0332771 A1 10/2020 Van Der Zee et al.
2021/0108616 A1* 4/2021 Hørdum ................. B23Q 3/063

FOREIGN PATENT DOCUMENTS

EP 2458200 A1 5/2012
EP 2981717 A1 2/2016
EP 3543524 A1 9/2019
WO WO-2018001424 A1 * 1/2018 ............. F03D 13/10
WO WO-2020245124 A1 * 12/2020 ........... F03D 1/0658

OTHER PUBLICATIONS

European Search Report Corresponding to EP20383056 dated Apr. 30, 2021.

* cited by examiner

*Primary Examiner* — Christopher Verdier
(74) *Attorney, Agent, or Firm* — Dority & Manning, P.A.

(57) ABSTRACT

A root portion for a wind turbine blade includes a coupling flange configured for coupling the root portion to a hub of the wind turbine. At least one support element is fixedly attached directly to the coupling flange and defines a support plane for contacting a transport or storing surface. The at least one support element includes a block member having an arcuate inner surface that conforms to and is affixed directly to an outer circumference of the coupling flange, and an opposite outer surface that defines the support plane.

10 Claims, 6 Drawing Sheets

ROOT PORTION FOR A WIND TURBINE BLADE

FIELD

The present disclosure relates to a root portion for a wind turbine blade, to a wind turbine blade comprising such a root portion and to methods for positioning, and for transporting and storing said wind turbine blade.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

The storage and transport of wind turbine blades has become more and more of a challenging task due to the general tendency to increase the size of modern wind turbines and a corresponding increase in the size and weight of the blades. Blades of modern wind turbines may be more than 70 or 80 meters, or even more than 100 meters long. Before installation, and after manufacture, the wind turbine blades may have to be temporarily stored and further transported to the installation site. Once the blades have been transported to the installation site or to the wind park which may be offshore, the wind turbine blades may be hoisted towards the rotor hub.

In the art, blade-specific support cradles may be provided on respective transport and/or storage means. Those blade-specific support cradles are adapted to the outer shape of the blade (at the root and/or tip portion) and are intended to receive the blade under a pre-defined orientation. However, blade-specific support cradles are expensive and require extensive retooling of respective the transport and/or storage means, in case different types of turbine blades shall be transported or stored.

Further, in the art, circular-bow-shaped support cradles are used. When using said circular-bow-shaped support cradles the blade can be received under substantially any angular orientation. However, since the blades may have a significant curvature, including twist and sweep, and in order to be able to correctly support a tip portion of a blade, the blade root needs to be positioned in the cradle at a given orientation rather precisely.

As the root portion of a turbine blade typically has a substantially circular shape, it is difficult to place the root portion of the turbine blade exactly under a pre-defined angular orientation, to achieve the desired angular orientation of the tip portion. This is particularly, if the tolerances for orientating the tip portion must be set low, to avoid transporting and/or storing damages.

The present disclosure provides a root portion for a wind turbine blade, a turbine blade and a method for transporting and/or storing a wind turbine blade that resolve the aforementioned disadvantages, at least partially.

SUMMARY

In a first aspect of the present disclosure, a wind turbine blade includes a root portion that defines an end face of the wind turbine blade and includes a coupling flange fixed to the end face of the blade, the coupling flange configured for coupling the root portion to a hub of a wind turbine, and at least one support element fixedly attached directly to the coupling flange and extending radially outward from an outermost circumference of the end face of the blade, wherein the at least one support element defines a support plane for contacting a transport and/or storing surface, the support plane being radially outward of the outermost surface of the end face of the blade. The support element may be a block member having an arcuate inner surface that conforms to and is affixed directly to an outer circumference of the coupling flange, and an opposite outer surface that defines the support plane.

The term support element as used throughout the present disclosure should be regarded as any structure that because of material properties, structure, or shape contributes to the formation of a support plane. The transport and/or storing surface is typically provided on a transport and/or storing means, that is different from the root portion and the wind turbine blade. The transport and/or storing surface as used throughout the present disclosure can be any surface, particularly flat surface, that is supports the root portion and/or the wind turbine blade during transport and storing, as it comes into contact with the support plane, defined by the at least one support element.

Since the support element is fixedly attached to the coupling flange, the support plane is fixed with respect to the root of the blade. A blade may thus be placed or positioned on a support element, a fixture or the floor or ground, and the support plane ensures that this occurs in a given orientation of the blade, thereby making sure that also a tip portion may be suitable supported if necessary.

In another aspect, a wind turbine blade includes a blade root having a coupling flange configured for coupling the root to a hub of a wind turbine, the coupling flange comprising one or more support elements, which define a substantially flat support area for contacting a transport and/or storing surface.

In accordance with this aspect, a flat support area is thus incorporated in the wind turbine blade, such that a blade cam simply be placed on a floor or ground area with a known orientation of the blade.

In yet a further aspect, a method for positioning a wind turbine blade is provided. The method comprises providing a wind turbine blade comprising a blade root mounting flange defining an annular mounting surface for mounting the wind turbine blade to a hub of a wind turbine, the blade root mounting flange comprising one or more portions protruding beyond the annular mounting surface. The method comprises placing the wind turbine blade on a storing surface so as to be supported by the portions of the mounting flange protruding beyond the annular mounting flange.

The terms coupling flange and mounting flange are used interchangeably herein. The term coupling flange or mounting flange is used to denote a part of a root portion of a wind turbine blade which is used to attached to another component of a wind turbine, and in particular, the wind turbine hub or a pitch bearing of the wind turbine hub.

BRIEF DESCRIPTION OF THE DRAWINGS

In the following, aspects of the present disclosure are described in detail, with respect to the accompanying figures.

DETAILED DESCRIPTION OF EXAMPLES

Figure 1:
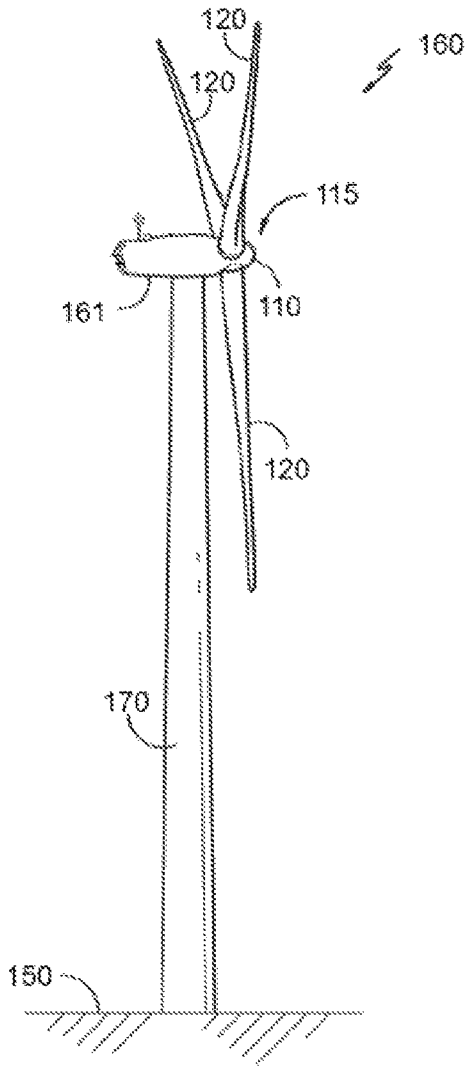
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a perspective view of one example of a wind turbine 160. As shown, the wind turbine 160 includes a tower 170 extending from a support surface 150, a nacelle 161 mounted on the tower 170, and a rotor 115 coupled to the nacelle 161. The rotor 115 includes a rotatable hub 110 and at least one rotor blade 120 coupled to and extending outwardly from the hub 110. For example, in the illustrated embodiment, the rotor 115 includes three rotor blades 120. However, in an alternative embodiment, the rotor 115 may include more or less than three rotor blades 120. Each rotor blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Figure 2:
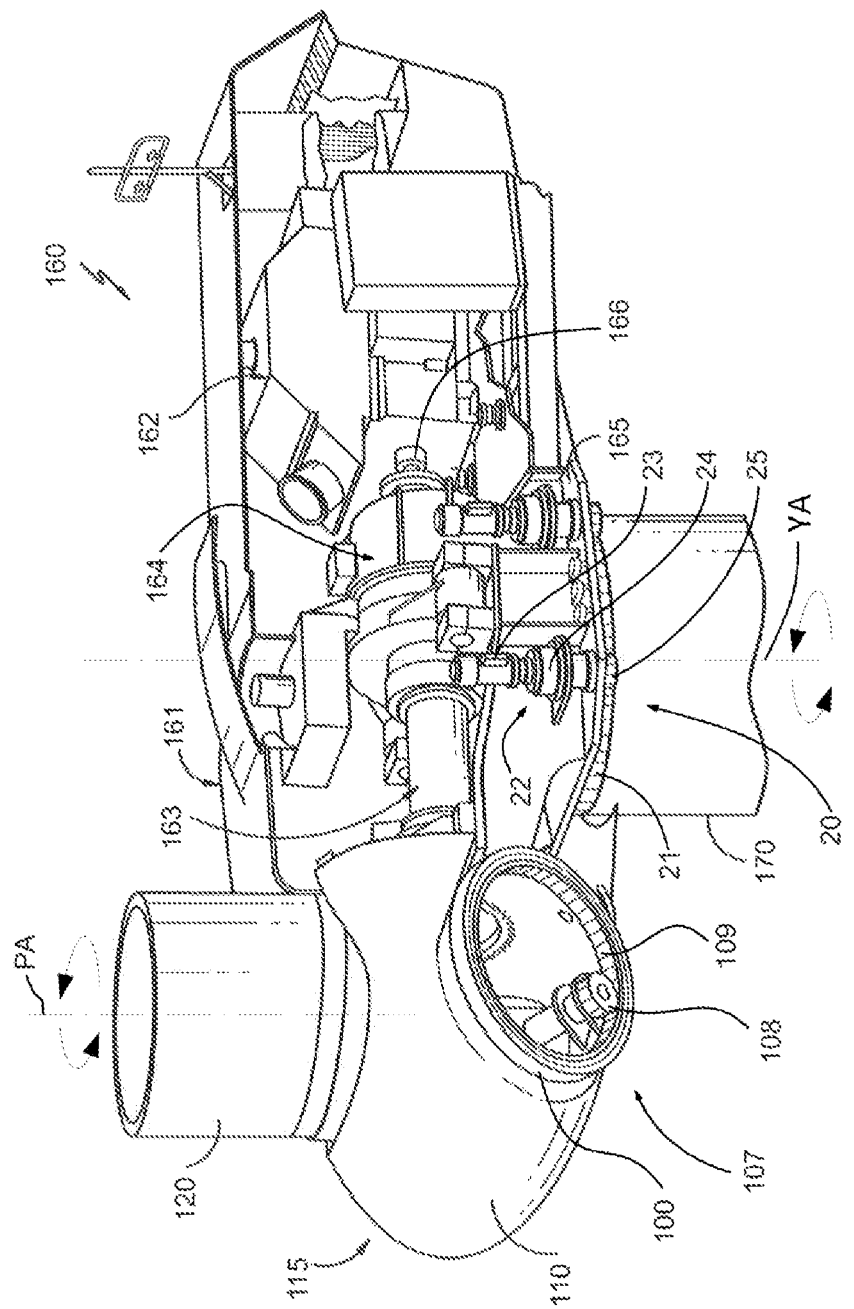
FIG. 2 schematically illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

The nacelle 161 is rotatably coupled to the tower 170 through the yaw system 20 in such a way that the nacelle 161 is able to rotate about a yaw axis YA. The yaw system 20 comprises a yaw bearing having two bearing components configured to rotate with respect to the other. The tower 170 is coupled to one of the bearing components and the bedplate or support frame 165 of the nacelle 161 is coupled to the other bearing component. The yaw system 20 comprises an annular gear 21 and a plurality of yaw drives 22 with a motor 23, a gearbox 24 and a pinion 25 for meshing with the annular gear 21 for rotating one of the bearing components with respect to the other.

Blades 120 are coupled to the hub 110 with a pitch bearing 100 in between the blade 120 and the hub 110. The pitch bearing 100 comprises an inner ring and an outer ring. A wind turbine blade may be attached either at the inner bearing ring or at the outer bearing ring, whereas the hub is connected at the other. A blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis PA.

Figure 3:
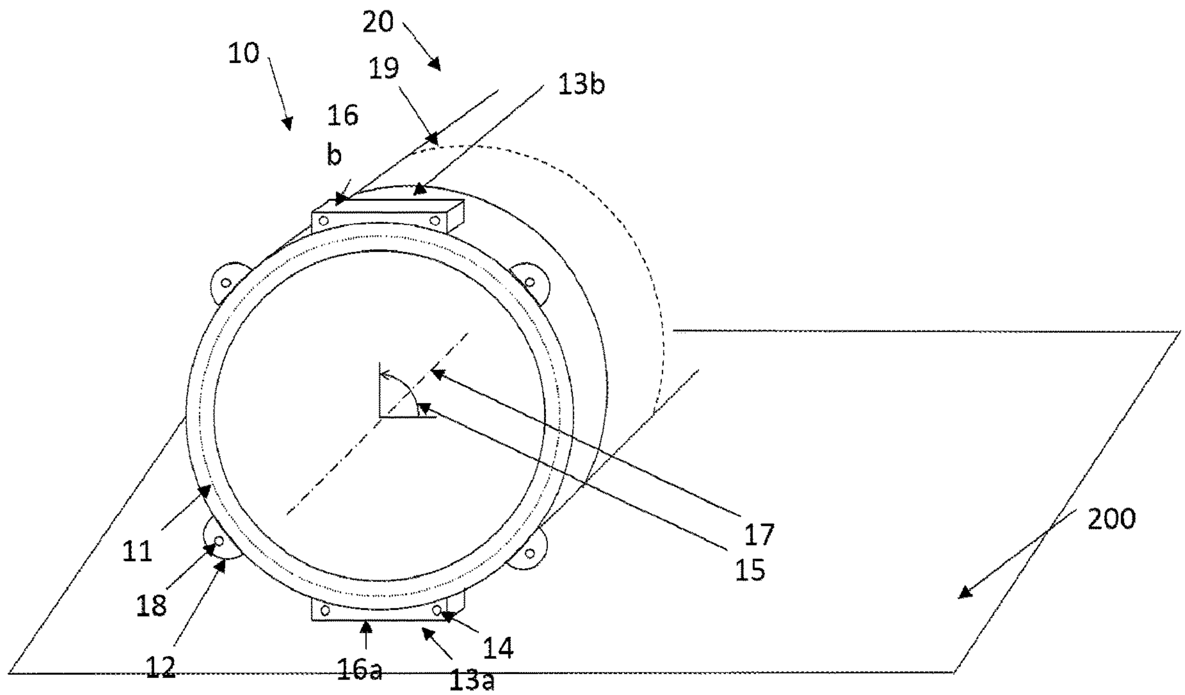
FIG. 3 schematically illustrates an example of a root portion of a wind turbine blade.

FIG. 3 illustrates an example of a root portion 10 for a wind turbine blade 120 comprising a coupling flange 11. The coupling flange 11 is configured for coupling the root portion to a hub 110 of a wind turbine 160 (e.g. via a pitch bearing). The coupling flange 11 may carry a plurality of fasteners which may be adapted to mate with corresponding fasteners, such as holes or similar, at the hub 110 of the wind turbine 160. The fasteners may be e.g. pins, bolts or studs. These fasteners may be introduced particularly in corresponding holes of a pitch bearing ring. Another pitch bearing may be attached to the hub.

The coupling flange 11 may be a circular flange. Further, the coupling flange 11 may be made from two symmetric halves being welded together.

The at least one support element 13*a*, 13*b* defines a support plane 16*a*, 16*b* for contacting a transport and/or storing surface 200. The support plane 16*a*, 16*b* of the support element 13*a*, 13*b* may be defined by a flat surface provided on the support element 13. If the support plane 16*a* is substantially flat, a root portion of a wind turbine blade may be positioned e.g. on a floor or ground surface without the need of any specific cradle or any specifically prepared storage or transportation tool.

As FIG. 3 illustrates, the root portion 10 may comprise an outer circumference and the at least one support element may radially extend form said outer circumference of the coupling flange.

Further, the root portion 10 may comprise at least one fastening element 12, including a transportation means and/or handling means 18. The at least one fastening element 12 radially extends from the outer circumference of the coupling flange 11.

The root portion 10 in the example of FIG. 3 further comprises two support elements 13*a*, 13*b* disposed at diametrically opposite positions to each other at an outer circumference of the coupling flange. Each support element 13 is being fixedly attached to the coupling flange 11. Other examples may comprise different support elements 13 and arrangements thereof, as e.g. shown in FIGS. 4A to 4D. The support elements 13 may in some examples be equally distributed around the outer circumference of the coupling flange 11 and may further comprise at least one transportation feature and/or handling feature 14.

The transportation feature and/or handling feature 14, 18 of the at least one fastening element 12 and/or the support elements 16a, 16b may include at least one of the following: a through hole, an undercut, a rail, a counterpart for a gripping tool, a frictional connection means, a threaded hole and/or a groove. In the illustrated example, holes 14, 18 may be used for attachment of lifting equipment, e.g. lifting equipment integrated or attached to a crane. This may enable easier handling and installation of the blade.

The support element(s) 13 may be made from the same material as the coupling flange 11. The material of the support element(s) and the coupling flange may be metallic, such as steel or other metal-based alloys. Further, the support element(s) 13 and the coupling flange 11 may be formed integrally, e.g. by casting. In a further aspect, the coupling flange 11 and the support element(s) may be cut, milled or otherwise machined from a single part, e.g. a metallic base element. Further, the support element(s) may be attached to the flange portion 11 by welding.

The support elements 13a, 13b shown in FIG. 3 define two support planes 16a, 16b, wherein a first support plane 16a of the respective support element 13a is contacting a transport and/or storing surface 200. A second support plane 16b is arranged opposite to the first support plane (substantially parallel thereto) and is presently not in use.

The support planes 16a, 16b are defined in this example by flat surfaces provided on the support elements 13a, 13b. Other examples with different support elements 13 exist, wherein at least one support element 13 defines a support plane 16 for contacting a transport and/or storing surface 200. Each of the support elements 13 may be associated with a respective support plane 16. Further, a support plane may be defined by at least two of different support elements. By defining more than one support plane, and particularly at diametrically opposition positions, blades may be positioned or stored in different orientations. In particular, blades may be stacked in different orientations.

The support element 13a may further define an angle 15 of the coupling flange 11 around a central axis 17 of the coupling flange 11, relative to the transport and/or storing surface 200, as the support plane 16a is in contact with the respective transport and/or storing surface 200.

FIGS. 4A-4D schematically illustrate further examples of root portions 10 and wind turbine blades incorporating support elements 13.

Figure 4A:
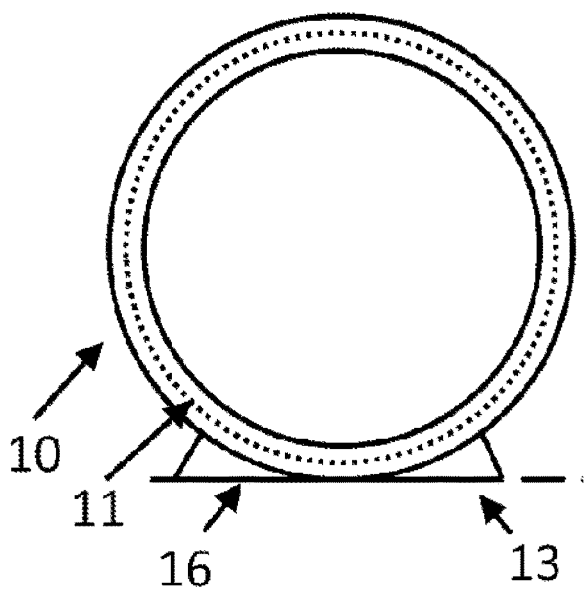
FIGS. 4A-4D schematically illustrate further examples of a root portion with different support elements.

In the example of FIG. 4A, a single support element 13 may be incorporated in the coupling flange of the root of the wind turbine blade. The support element 13 in this example defines a substantially flat support plane upon which the wind turbine blade can rest. The support plane substantially coincides, at a point, with an outer circumference of the annular mounting surface 11 of the flange. In other words, the support plane is tangential to an outer circumference of the coupling flange 11.

Figure 4B:
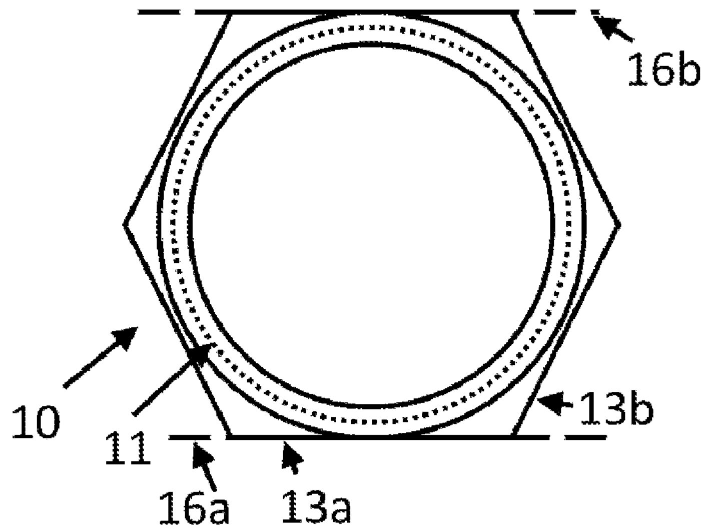

FIG. 4B illustrates another example, in which the mounting flange including support elements 13 is symmetric with respect to a horizontal axis passing through a center of the root when the blade is supported on its support plane 16a. In this particular example, the mounting flange is rotationally symmetrical. An outer circumference of the mounting flange in this example is hexagonal.

At least two support planes 16a, 16b are defined by the mounting flange.

Figure 4C:
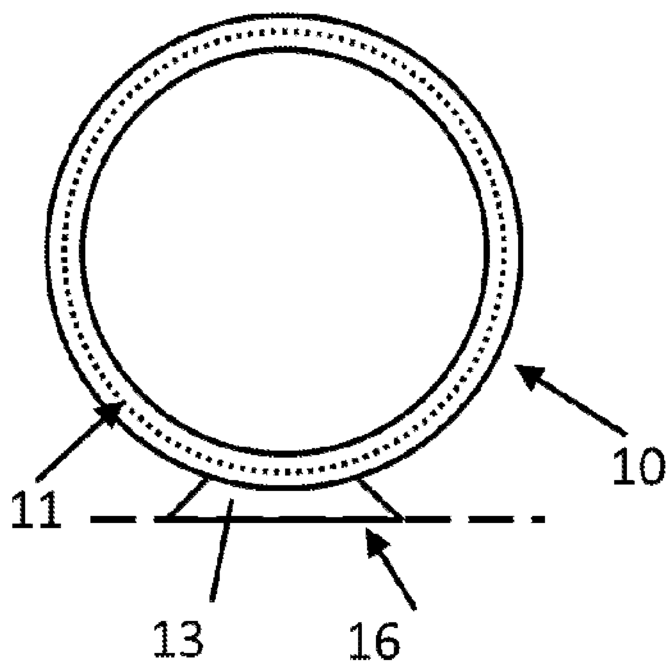

In the example of FIG. 4C, the mounting flange comprises a protrusion 13 protruding beyond annular mounting surface. A support 13 with a substantially triangular shape is provided. The root portion 10 of the wind turbine blade may be supported by support plane 16, forming the base of the triangular shape.

Figure 4D:
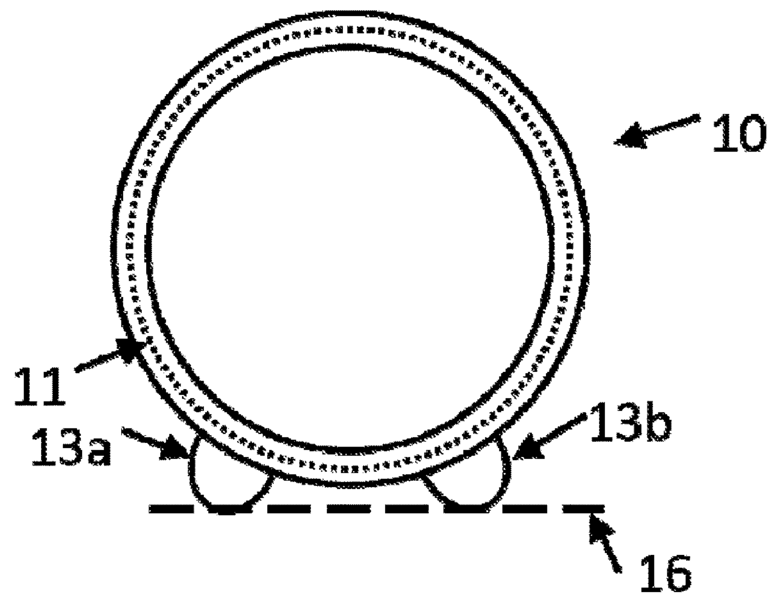

As illustrated in another example in FIG. 4D the support plane 16 of the support element 13 may be defined by a first point of support on a first support element 13a and a second point of support provided on a second support element 13b, which is different from the first support element.

Figure 5:
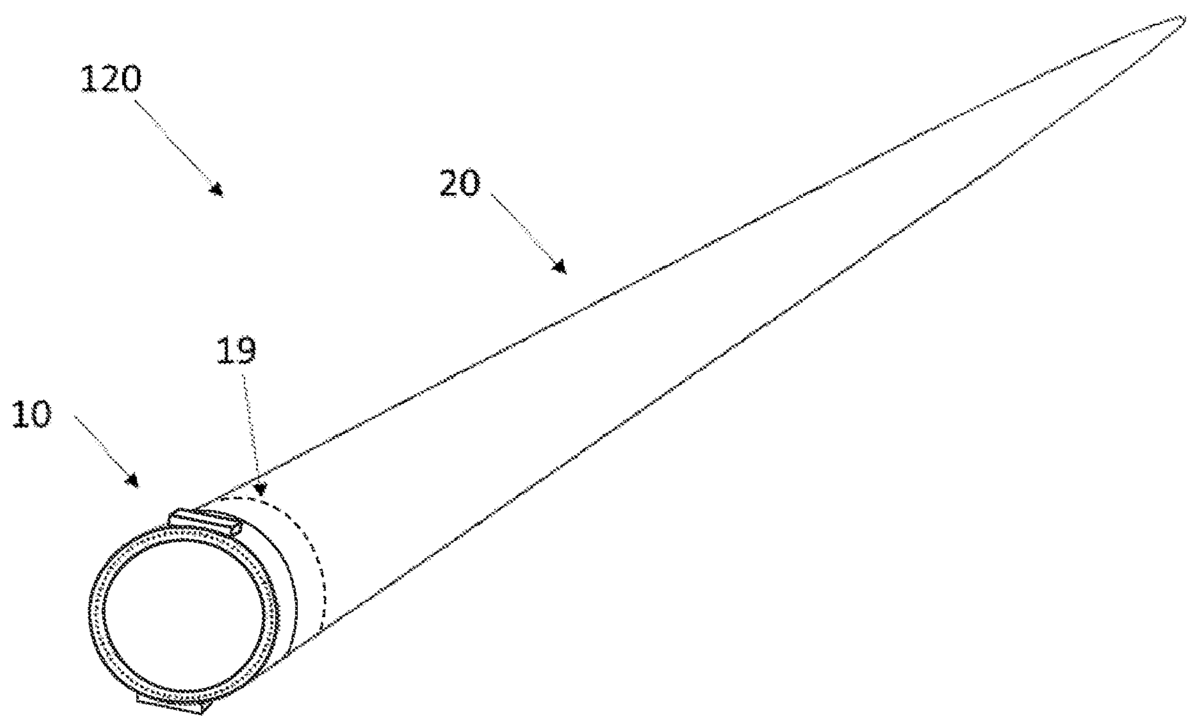
FIG. 5 schematically illustrates an example of a wind turbine blade.

FIG. 5 illustrates a wind turbine blade 120 comprising a blade root 10 having a coupling flange, configured for coupling the root to a hub of a wind turbine. The coupling flange comprises one or more support elements, which define a substantially flat support area for contacting a transport and/or storing surface.

As may be seen in FIG. 5, the wind turbine blade 120 may comprise a first support element at a first position, and a second support element at a second position, which is diametrically opposite to the first position.

In some examples, the support elements may be integrally formed with the coupling flange. In some examples, the blade may further comprise a plate, partially closing off an inside of the wind turbine blade. Such a plate may stiffen and reinforce a blade root portion. The plate may comprise one or more manholes allowing access to an interior of the blade.

A blade shell generally defines a leading edge, trailing edge, pressure surface and suction surface, and may be made of composite material, such as glass fibre composite, carbon fibre composite, or combinations thereof. Further, the mounting flange may be attached to the blade shell as part of a resin infusion or injection process. After curing takes places, the blade shell of composite material is then firmly attached to the coupling flange. The coupling flange includes the aforementioned support elements 13.

The blade may comprise multiple segments that can be coupled to form a respective wind turbine blade 120. The length of the blade portion 20 may be in the range from 30 m to 150 m, or in the range from 50 m to 120 m, or in the range from 60 m to 110 m.

Figure 6:
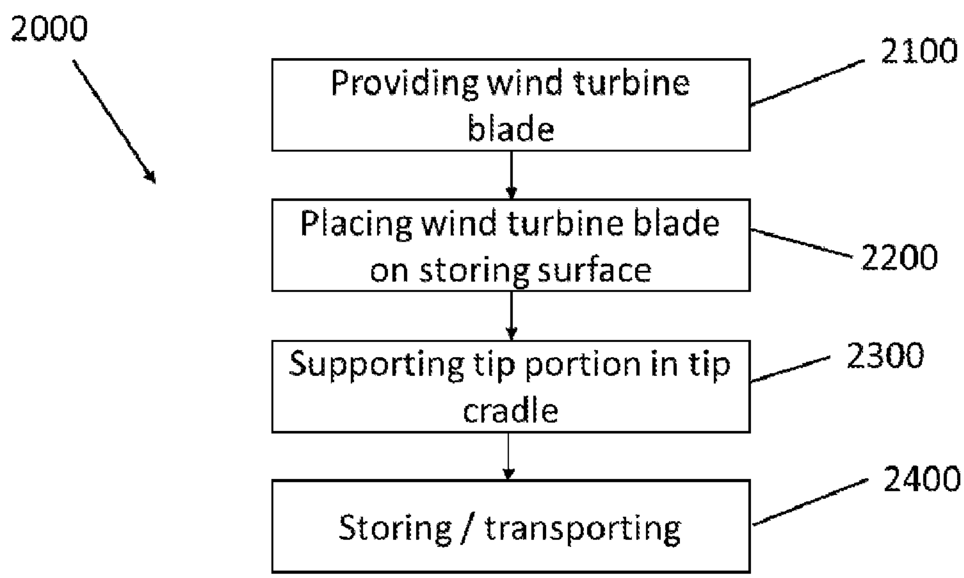
FIG. 6 schematically illustrates a flow diagram of an example of a method for positioning a wind turbine blade.

FIG. 6 illustrates a flow diagram of a method 2000 for positioning a wind turbine blade 120. The method comprises providing at block 2100 a wind turbine blade including a blade root mounting flange defining an annular mounting surface for mounting the wind turbine blade 120 to a hub of a wind turbine. The blade root mounting flange comprises one or more portions protruding beyond the annular mounting surface.

As noted before, the blade root mounting flange may be attached indirectly to the hub of the wind turbine through a pitch bearing.

The method then comprises placing, at block 2200, the wind turbine blade 120 on a storing surface 200 so as to be supported by the portions of the mounting flange protruding beyond the annular mounting flange.

In some examples, the portions protruding beyond the annular mounting surface define an orientation of the mounting flange 11 relative to a storage surface 200.

The method may further comprise, at block 2300, providing a tip portion of the wind turbine blade on a tip cradle. If the protrusions outside the annular mounting surface of the blade root define a support plane, it can be ensured that the tip portion of the blade is correctly orientated such that it can be positioned within a cradle for supporting the tip portion.

The method may then comprise, at block 2400, transporting the blade, or storing and optionally subsequently transporting the blade. Any suitable transportation device might be used such as e.g. a crane, a truck, a low-loader, a trailer, a towing vehicle a sea container and/or a ship.

After arrival at a site, the blade may be installed on a hub of the wind turbine. The protrusions extending beyond the annular mounting flange of the root do not need to be removed prior to operation of the wind turbine.

In any of the herein disclosed examples, the wind turbine blades may be, but do not need to be, a segmented blade. A segmented blade is a blade in which a root portion and a tip portion (and optionally further blade portions) are manufactured and transported separately. The root portion may then be attached to the tip portion before installation.

In any of the herein disclosed examples, the blades may directly or indirectly be attached to a wind turbine blade hub. An indirect attachment may herein be understood as an attachment with another element in between the blade and the hub, in particular a pitch bearing. More particularly, a pitch bearing may comprise an inner and an outer bearing ring with one or more rows of rolling elements (rollers, balls or other) in between. One of the outer and inner bearing rings may be attached to the hub, and the other of the inner and outer bearing ring may be attached to the wind turbine blade.

Even though some features of fasteners, lifting attachments etc. for handling, and hoisting were only illustrated with respect to FIG. 3, it should be clear that the same or similar features can also be included in any of the examples of FIGS. 4 and 5.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have fastening elements that do not differ from the literal language of the claims, or if they include equivalent fastening elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

LIST OF REFERENCE SIGNS

10 root portion
11 coupling flange
12 fastening element including a transportation and/or handling feature
13 support element
13*a* first support element
13*b* second support element
14 transportation and/or handling feature
15 rotation angle
16 support plane
16*a* first support plane
16*b* second support plane
17 central axis
18 transportation and/or handling means
19 attachment line
20 blade portion
100 pitch bearing
107 pitch system
108 pinion
109 annular gear
110 hub of a wind turbine
115 rotor
120 wind turbine blade (rotor blade)
150 support surface
160 wind turbine
161 nacelle
162 generator
163 rotor shaft
164 gearbox
165 support frame
166 generator shaft
170 tower
200 transport and/or storing surface
2000 a method for positioning a wind turbine blade
2100 providing a wind turbine blade
2200 placing the wind turbine blade on a transport and/or storing surface
2300 supporting tip portion of blade in tip cradle
2400 storing and/or transporting the wind turbine blade

The invention claimed is:

1. A wind turbine blade, comprising:
a root portion, the root portion defining an end face of the wind turbine blade;
a coupling flange fixed against the end face of the wind turbine blade and configured for coupling the root portion to a hub of a wind turbine;
at least one support element fixedly attached directly to the coupling flange and extending radially outward relative to an outermost circumference of the end face of the wind turbine blade, wherein the at least one support element defines a support plane for contacting a transport or storing surface, the support plane being radially outward of the outermost circumference of the end face of the wind turbine blade; and
wherein the at least one support element comprises a block member having an arcuate inner surface that conforms to and is affixed directly to an outer circumference of the coupling flange, and an opposite outer surface that defines the support plane.

2. The wind turbine blade according to claim 1, wherein the support plane comprises a flat surface defined on the outer surface of the at least one support element.

3. The wind turbine blade according to claim 2, wherein the flat surface is tangential to the outer circumference of the coupling flange.

4. The wind turbine blade according to claim 1, comprising a first one and a separate second one of the support elements.

5. The wind turbine blade according to claim 1, comprising a plurality of the support elements, wherein at least two of the support elements are disposed diametrically opposite to each other at the outer circumference of the coupling flange, or wherein the support elements are evenly distributed around the outer circumference of the coupling flange.

6. The wind turbine blade according to claim 1, wherein the at least one support element comprises one or more holes configured for attachment to a lifting tool.

7. The wind turbine blade according to claim 1, wherein the at least one support element is made from a same material as the coupling flange.

8. The wind turbine blade according to claim 1, wherein the at least one support element is welded to the coupling flange.

9. The wind turbine blade according to claim 1, wherein the at least one support element is integrally formed with the coupling flange.

10. The wind turbine blade according to claim 1, further comprising at least one fastener fixedly attached to the coupling flange and radially extending from the outer circumference of the coupling flange.

* * * * *